US011335959B2

(12) United States Patent
Singh et al.

(10) Patent No.: US 11,335,959 B2
(45) Date of Patent: May 17, 2022

(54) IONIC LIQUIDS FOR ARTIFICIAL SEI TRANSPLANTATION

(71) Applicants: Toyota Motor Engineering & Manufacturing North America, Inc., Plano, TX (US); Deakin University, Geelong (AU)

(72) Inventors: Nikhilendra Singh, Ann Arbor, MI (US); Timothy S. Arthur, Ann Arbor, MI (US); Kensuke Takechi, Ann Arbor, MI (US); Patrick Howlett, Box Hill South (AU); Maria Forsyth, Ashburton (AU); Robert Kerr, Croydon South (AU)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 306 days.

(21) Appl. No.: 16/527,994

(22) Filed: Jul. 31, 2019

(65) Prior Publication Data
US 2019/0356024 A1    Nov. 21, 2019

Related U.S. Application Data

(63) Continuation-in-part of application No. 15/606,803, filed on May 26, 2017, now Pat. No. 10,505,219.

(51) Int. Cl.
*H01M 10/0568* (2010.01)
*H01M 4/139* (2010.01)
(Continued)

(52) U.S. Cl.
CPC ....... *H01M 10/4235* (2013.01); *H01M 4/139* (2013.01); *H01M 10/0525* (2013.01); *H01M 10/0568* (2013.01); *H01M 10/0569* (2013.01); *H01M 2300/0028* (2013.01); *H01M 2300/0045* (2013.01)

(58) Field of Classification Search
CPC ......... H01M 10/0568; H01M 10/0569; H01M 10/4235; H01M 4/139
See application file for complete search history.

(56) References Cited

U.S. PATENT DOCUMENTS 6,053,953 A    4/2000  Tomiyama et al.
6,344,293 B1   2/2002  Geronov
(Continued)

OTHER PUBLICATIONS

Lane, G. et al., "Ionic Liquid Electrolyte for Lithium Metal Batteries: Physical, Electrochemical, and Interfacial Studies of N-Methyl-N-butylmorpholinium Bis(fluorosulfonyl)imide," J. Phys. Chem. C 2010, 114, 49, pp. 21775-21785.
(Continued)

*Primary Examiner* — Jonathan G Jelsma
(74) *Attorney, Agent, or Firm* — Christopher G. Darrow; Darrow Mustafa PC

(57) ABSTRACT

An anode for a lithium or lithium-ion cell, protected with an SEI by pre-treatment in an SEI-formation cell, is stable for cell cycling even in the presence of substantial water in the cell electrolyte. A method for making the protected anode includes forming an SEI on a lithium or lithium-ion electrode by performing multiple charge/discharge cycles on the
(Continued)

electrode in a first cell having an SEI formation electrolyte to produce the protected anode. The SEI formation electrolyte includes an ionic liquid having at least one of eight organic cations.

13 Claims, 10 Drawing Sheets

(51) Int. Cl.
  *H01M 10/0569* (2010.01)
  *H01M 10/42* (2006.01)
  *H01M 10/0525* (2010.01)

(56) References Cited

U.S. PATENT DOCUMENTS

| | | | |
|---|---|---|---|
| 9,276,292 | B1 | 3/2016 | MacKenzie et al. |
| 2002/0036884 | A1 | 3/2002 | Shimamoto et al. |
| 2005/0136247 | A1 | 6/2005 | Sumiya et al. |
| 2007/0042271 | A1 | 2/2007 | Nishida et al. |
| 2008/0094777 | A1 | 4/2008 | Nishida |
| 2013/0345380 | A1 | 12/2013 | Schmidt et al. |
| 2014/0125292 | A1 | 5/2014 | Best et al. |
| 2014/0212772 | A1 | 7/2014 | Nakamoto et al. |
| 2016/0126582 | A1 | 5/2016 | Xiao et al. |
| 2018/0062206 | A1 | 3/2018 | Yang et al. |
| 2018/0151916 | A1 | 5/2018 | Howlett et al. |
| 2019/0252689 | A1 | 8/2019 | Xu et al. |

OTHER PUBLICATIONS

Girard, G.M.A. et al., "Electrochemical and physicochemical properties of small phosphonium cation ionic liquid electrolytes with high lithium salt content," Phys. Chem. Chem. Phys., 2015, 17, pp. 8706-8713.

Pozo-Gonzalo, C. et al., "Redox Chemistry of the Superoxide Ion in a Phosphonium-Based Ionic Liquid in the Presence of Water," J. Phys. Chem. Lett., 2013, 4, pp. 1834-1837.

Pozo-Gonzalo, C. et al., "Insights into the reversible oxygen reduction reaction in a series of phosphonium-based ionic liquids," Phys. Chem. Chem. Phys., 2014, 16, pp. 25062-25070.

Pozo-Gonzalo, C. et al., "Enhanced performance of phosphonium based ionic liquids towards 4 electronix oxygen reduction reaction upon addition of a weak proton source," Electrochemistry Communications, 38 (2014) pp. 24-27.

Mizuno, F. et al., "Water in Ionic Liquid for Electrochemical Li Cycling," ACS Energy Lett., 1, (2016) pp. 542-547.

Misback, Bob, "Large Format Li4Ti5O12 Lithium-Ion Batteries Performance and Applications," Altairnano.com (2010) http://www.aertc.org/conference2010/speakers/AEC%202010%20Session%204/4F%20ESO%20Bat.%20Chem.%20&%20Mat.%201/Robert%20Misback/Large%20Format%20Li4Ti5O12%20Lithium-Ion%20BatteriesSECURED.pdf (last accessed Jul. 9, 2019).

Kerr, R. et al., "Water-tolerant lithium metal cycling in high lithium concentration phosphonium-based ionic liquid electrolytes," Sustainable Energy Fuels, vol. 2, pp. 2276-2283 (2018).

| Water Content | | 1 vol. % | | 2 vol. % | | 3 vol. % | 4 vol. % | 5 vol. % |
|---|---|---|---|---|---|---|---|---|
| SEI Source (ILE Identity) | | | | | | | | |
| 1:1 N1223FSI:LiFSI | +0.08 V / -0.07 V | 73 Ω cm² | +0.08 V / -0.07 V | 158 Ω cm² | 36 Ω cm² | +0.29 V / -0.34 V | +5.00 V / -5.00 V | 158 | 6,130 | 853 Ω cm² | 173 | 11,390 | 9,344 Ω cm² |
| 1:1 DEMEFSI:LiFSI | +0.14 V / -0.11 V | 99 Ω cm² | +0.08 V / -0.07 V | 171 Ω cm² | 40 Ω cm² | +0.14 V / -0.16 V | +5.00 V / -5.00 V | 1,448 | 3,098 | 1,172 Ω cm² | 69 | 6,866 | 8,503 Ω cm² |
| 1:1 Pip13FSI:LiFSI | +0.15 V / -0.13 V | 89 Ω cm² | +0.08 V / -0.07 V | 1,307 Ω cm² | 217 Ω cm² | | | |
| 1:1 Pyr12₀1FSI:LiFSI | +0.15 V / -0.18 V | 206 Ω cm² | +0.08 V / -0.07 V | 1,733 Ω cm² | 931 Ω cm² | | | |
| 1:1 P1114FSI:LiFSI | +0.23 V / -0.16 V | 67 Ω cm² | +0.08 V / -0.07 V | 47,564 Ω cm² | 48,648 Ω cm² | | | |
| 1:1 P1222FSI:LiFSI | +0.23 V / -0.19 V | 102 Ω cm² | +0.08 V / -0.07 V | 85 Ω cm² | 3,718 Ω cm² | | | |
| 1:1 Pyr13FSI:LiFSI | +0.07 V / -0.06 V | 92 Ω cm² | +0.08 V / -0.07 V | 127 Ω cm² | 7,420 Ω cm² | | | |
| 1:1 P1444FSI:LiFSI | +0.31 V / -0.34 V | 99 Ω cm² | +0.08 V / -0.07 V | 230 Ω cm² | | | | |
| 1:1 Im12FSI:LiFSI | +5.00 V / -5.00 V | 163 Ω cm² | +0.08 V / -0.07 V | 10,744 Ω cm² | | | | |
| 1:1 DEMETFSI:LiTFSI | +5.00 V / -5.00 V | 86 Ω cm² | +0.08 V / -0.07 V | 12,432 Ω cm² | | | | |
| 1:1 Pip13TFSI:LiTFSI | +5.00 V / -5.00 V | 88,617 Ω cm² | +0.08 V / -0.07 V | 13,350 Ω cm² | | | | |
| 1:1 N1223FSI:LiTFSI | +5.00 V / -5.00 V | 13,350 Ω cm² | +0.08 V / -0.07 V | 13,326 Ω cm² | | | | |
| 1:1 Pyr13TFSI:LiTFSI | +5.00 V / -5.00 V | 2,673 Ω cm² | +0.08 V / -0.07 V | 180 Ω cm² | | | | |
| 1:1 N1113TFSI:LiTFSI | +5.00 V / -5.00 V | 510 Ω cm² | +0.08 V / -0.07 V | 10,622 Ω cm² | | | | |
| 1:1 N1223TFSI:LiFSI | +5.00 V / -5.00 V | 134,945 Ω cm² | +0.08 V / -0.07 V | 120,590 Ω cm² | | | | |
| 1:1 Pyr14DCA:LiDCA | +5.00 V / -5.00 V | 104 Ω cm² | +0.08 V / -0.07 V | 7,502 Ω cm² | | | | |
| 1:1 N1444DCA:LiDCA | +5.00 V / -5.00 V | 392 Ω cm² | +0.08 V / -0.07 V | 5,830 Ω cm² | | | | |

FIG. 7

IONIC LIQUIDS FOR ARTIFICIAL SEI TRANSPLANTATION

CROSS-REFERENCE TO RELATED APPLICATIONS

This application is a continuation-in-part of U.S. patent application Ser. No. 15/606,803, which was filed May 26, 2017, and which is herein incorporated by reference in its entirety.

TECHNICAL FIELD

The present disclosure generally relates to electrodes for rechargeable batteries and, more particularly, to electrodes having preformed solid-electrolyte interphases.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Water reacts spontaneously with lithium metal, presenting a difficulty for aqueous lithium battery technology. In addition, it is known that common organic electrolytes for Li batteries do not function well in the presence of water. In particular, any water in these electrolytes results in cell failure.

Batteries are commonly known to form solid-electrolyte interphases (SEIs) at the contact points of solid electrodes and liquid electrolytes. These SEIs are often a combination of electrode and electrolyte components, sometimes including decomposition products of said electrolytes. SEIs at times will passivate an electrode, diminishing conductivity. However, at other times, SEIs will also provide a protective layer, stabilizing the electrode against corrosion or other undesired side reactions. No SEI is currently known that enables a lithium or lithium-ion anode to undergo stable cycling in the presence of water in the electrolyte.

Accordingly, it would be desirable to provide an improved method for protecting a lithium or lithium-ion anode against water in electrolyte.

SUMMARY

This section provides a general summary of the disclosure and is not a comprehensive disclosure of its full scope or all of its features.

In various aspects, the present teachings provide a method for optimizing an Artificial SEI transplantation (AST) system. The method includes a step of providing a library of SEI formation electrolytes, each electrolyte in the library having at least one lithium salt and at least one ionic liquid. The method further includes a step of preparing a library of protected lithium and/or lithium-ion anodes by (for each SEI formation electrolyte in the library of SEI formation electrolytes) forming a solid-electrolyte interphase (SEI) on the lithium or lithium-ion electrode by performing multiple charge/discharge cycles on the electrode in a cell having the SEI formation electrolyte. The method also includes a step of preparing a library of test cells by (for each protected lithium or lithium-ion anode in the library of protected lithium and/or lithium-ion anodes) assembling a test cell. Each test cell includes the protected anode and a wet electrolyte in contact with the protected anode. The wet electrolyte includes at least 50 ppm water. The method further includes a step of measuring an electrochemical property of each wet test cell in the library of test cells. The method also includes a step of selecting an SEI formation electrolyte on the basis of the measured electrochemical property.

In further aspects, the present teachings provide a method for optimizing an Artificial SEI transplantation (AST) system. The method includes a step of providing a library of SEI formation electrolytes, each electrolyte in the library having at least one active metal salt, that includes an active metal cation and at least one ionic liquid. The method further includes a step of preparing a library of protected active material anodes by (for each SEI formation electrolyte in the library of SEI formation electrolytes) forming a solid-electrolyte interphase (SEI) on the active material electrode by performing multiple charge/discharge cycles on the electrode in a cell having the SEI formation electrolyte. The protected active material anodes are configured to incorporate the active cation, in metallic or cationic form. The method also includes a step of preparing a library of test cells by (for each protected active material anode in the library of protected active material anodes) assembling a test cell. Each test cell includes the protected anode and a wet electrolyte in contact with the protected anode. The wet electrolyte includes at least 50 ppm water. The method further includes a step of measuring an electrochemical property of each wet test cell in the library of test cells. The method also includes a step of selecting an SEI formation electrolyte on the basis of the measured electrochemical property.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 7 is a table displaying results from a performance of a method of the present teachings for optimizing an AST system.

It should be noted that the figures set forth herein are intended to exemplify the general characteristics of the methods, algorithms, and devices among those of the present technology, for the purpose of the description of certain aspects. These figures may not precisely reflect the characteristics of any given aspect and are not necessarily intended to define or limit specific embodiments within the scope of this technology. Further, certain aspects may incorporate features from a combination of figures.

DETAILED DESCRIPTION

The present teachings provide methods for forming a solid electrolyte interphase (SEI) on an anode of a lithium or lithium-ion cell, and for transplanting the formed SEI on the anode, to a second lithium or lithium-ion cell. The protected anode so transplanted can be electrochemically stable when contacting a wet electrolyte, for example, an electrolyte having water in excess of 50 ppm.

The method for forming the SEI includes cycling the anode against an electrolyte that includes a lithium salt and an ionic liquid. In certain implementations, the lithium salt can be at least one of lithium bis(fluorosulfonyl)imide (LiFSI), lithium bis(trifluoromethanesulfonyl)imide (LiTFSI), or lithium dicyanamide (LiDCA). The ionic liquid includes at least one anion selected from the group consisting of FSI, TFSI, and DCA anion; and also includes at least one of twelve disclosed organic cations. As shown in the results below, this protects the anode when it is transplanted into the second lithium or lithium-ion cell having a water-containing electrolyte.

As used herein, a lithium cell refers to a cell having a lithium anode, and a lithium-ion cell refers to a cell having a lithium-ion anode. As further used herein, a lithium anode refers to an anode formed substantially of lithium metal, and a lithium-ion anode refers to an anode not formed of lithium metal, and capable of incorporating lithium ions.

Figure 1:
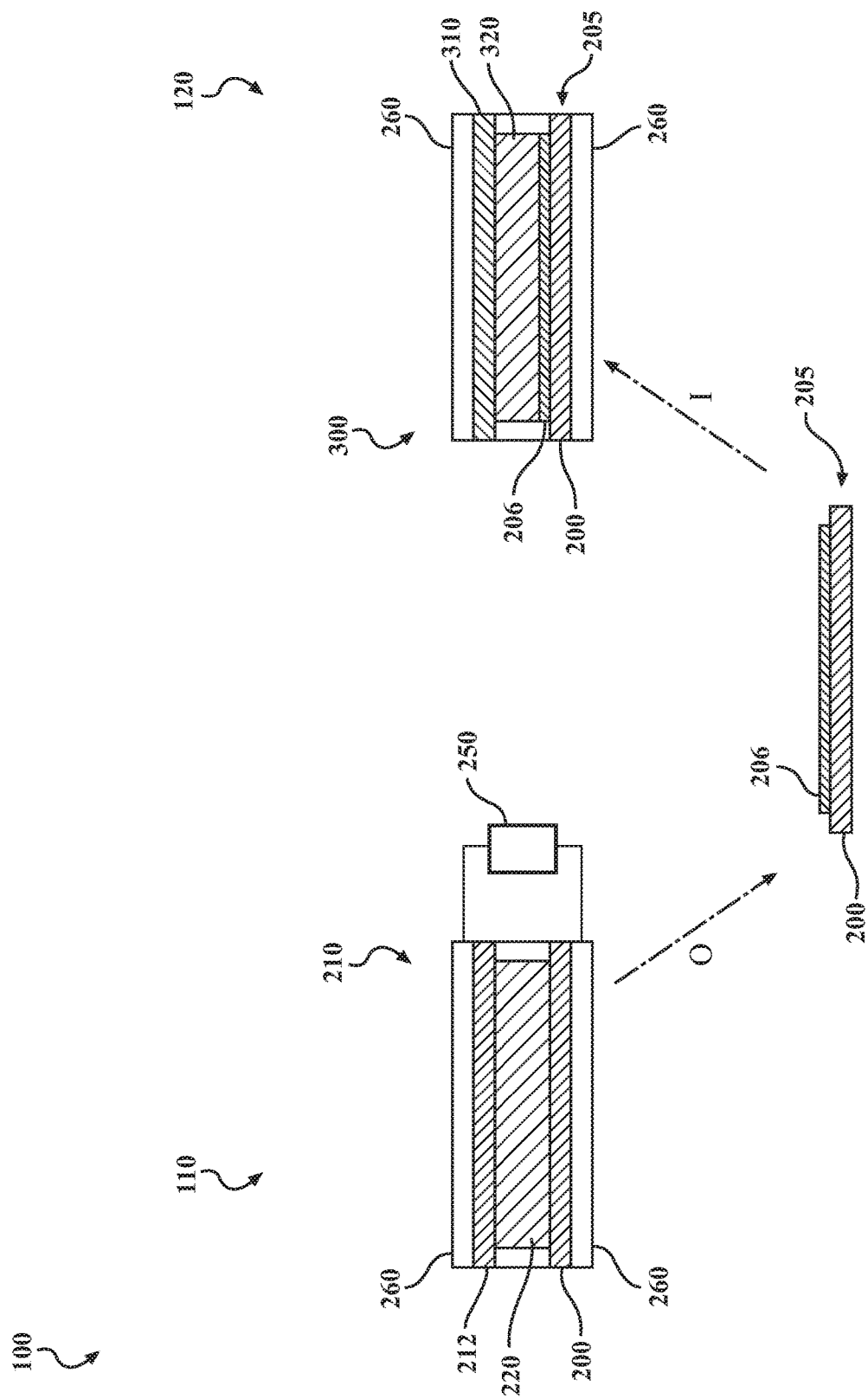
FIG. 1 is a schematic illustration of a method for preparing a lithium or lithium-ion cell, and also includes schematic illustrations of a first cell used to prepare a protected anode, and a wet lithium or lithium-ion cell that includes the protected anode.
Figure 2A:
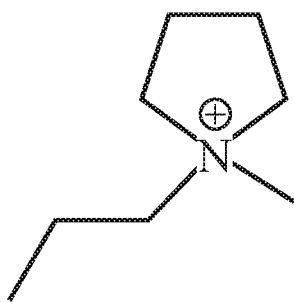
FIGS. 2A-2L are line drawings of organic cations suitable for use in an SEI formation electrolyte that is used in the first cell of FIG. 1.
Figure 2B:
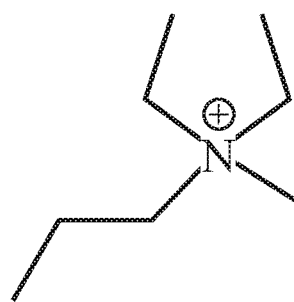
Figure 2C:
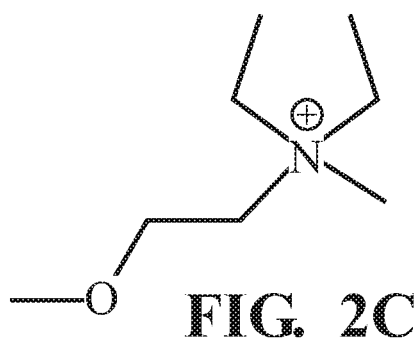
Figure 2D:
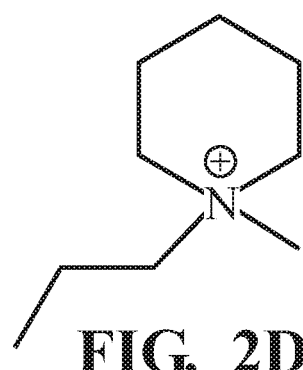
Figure 2E:
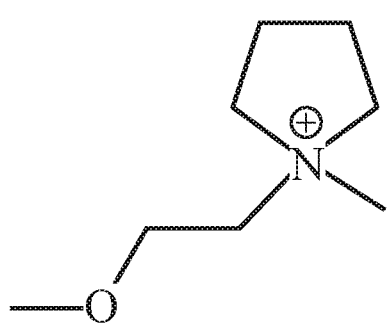
Figure 2F:
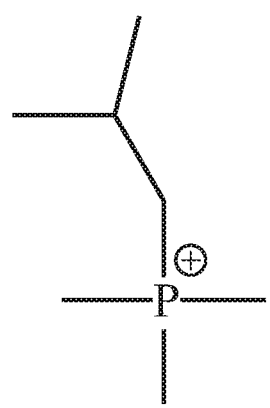
Figure 2G:
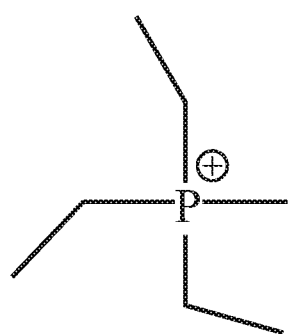
Figure 2H:
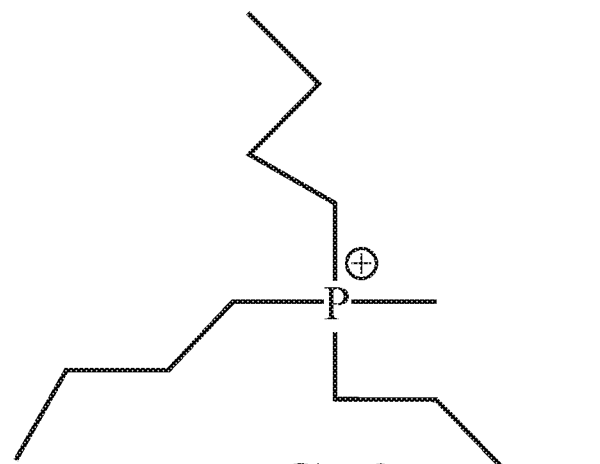
Figure 2I:
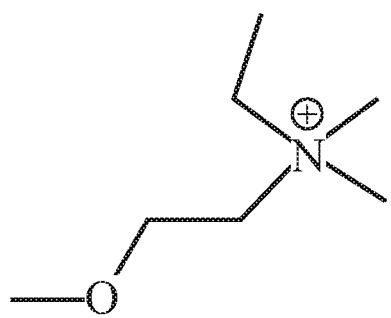
Figure 2J:
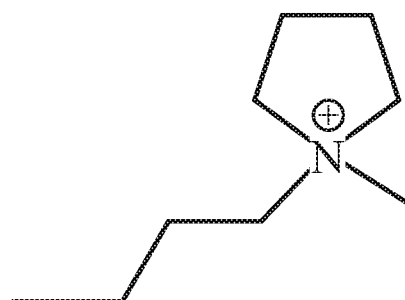
Figure 2K:
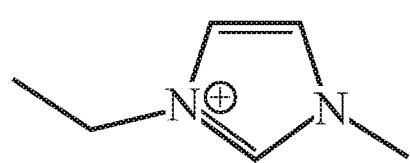
Figure 2L:
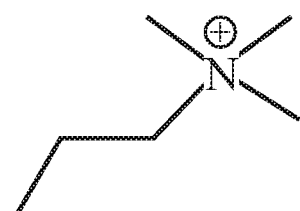

FIG. 1 discloses a schematic illustration of a method 100 for making a lithium or lithium-ion voltaic cell with a water-containing electrolyte. The method 100 includes a step 110 of forming an SEI by performing multiple charge/discharge cycles on a lithium or lithium-ion electrode 200 in a first cell 210 (alternatively referred to as an SEI formation cell 210) having an SEI formation electrolyte 220. The forming an SEI step 110 converts the lithium or lithium-ion electrode 200 into a protected lithium or lithium-ion anode 205. The SEI formation electrolyte 220 includes at least one lithium salt, and an ionic liquid. The at least one lithium salt includes a salt selected from the group consisting of lithium bis(fluorosulfonyl)imide (LiFSI), lithium bis(trifluoromethanesulfonyl)imide (LiTFSI), and lithium dicyanamide (LiDCA). The ionic liquid includes an anion selected from the group consisting of FSI, TFSI, and DCA. It will be understood that the ionic liquid and the lithium salt will typically include the same anion(s). The ionic liquid further includes at least one organic cation from the group including: 1-methyl-1-propylpyrrolidinium (referred to hereinafter as "Pyr13"; FIG. 2A); N-methyl-N,N-diethyl-N-propylammonium (N1223, FIG. 2B); N,N-diethyl-N-methyl-N-(2-methoxyethyl)-ammonium (DEME, FIG. 2C); 1,1-methyl-propylpiperidinium (referred to hereinafter as "Pip13", FIG. 2D); N-methyl-N-(2-methoxyethyl)-pyrrolidinium (Pyr12$_o$1, (FIG. 2E); trimethylisopropylphosphonium (P111$_i$4, FIG. 2F); methyltriethylphosphonium (P1222, FIG. 2G); methyltributylphosphonium (P1444, FIG. 2H); N,N-dimethyl-N-(2-methoxyethyl)-N-ethyl-ammonium (DMME, FIG. 2I); 1-methyl-1-butylpyrrolidinium (Pyr14, FIG. 2J); N-methyl-N'-ethylimidazolium (IM12, FIG. 2K); N,N,N-trimethyl-N-propylammonium (N1113, FIG. 2L); and mixtures thereof.

In some implementations, the SEI formation electrolyte will include lithium salt present at a molar ratio, relative to ionic liquid of: at least 1:5; or at least 1:2, or at least 1:1. In some implementations, the SEI formation electrolyte 220 will include lithium salt present at its saturation point in the ionic liquid (i.e. the SEI formation electrolyte 220 is a saturated solution of lithium salt in the ionic liquid).

In some implementations, the SEI formation electrolyte 220 can be dry. As used herein, "dry" means having water content of less than 50 ppm. Water content values in all cases discussed herein can be measured by the Karl Fischer titration.

It will be noted that the first cell 210 of FIG. 1 is a symmetrical cell having two electrodes 200 of identical composition and that are alternatingly charged and discharged by reversible application of an external power source. It will be appreciated, however, that the forming an SEI step 110 can also be performed where the first cell 210 is a voltaic cell using the electrode 200 as an anode opposite an appropriate cathode, so long as the SEI formation electrolyte 220 is employed. In some implementations, the SEI forming step 110 can be performed by cycling the first cell 210 at 1 mAh·cm$^{-2}$ for at least 10 cycles.

The lithium or lithium-ion electrode 200 can generally be any electrode suitable for use as an anode in a lithium or lithium-ion voltaic cell. It will be understood that the term "anode", as used herein, refers to an electrode at which electrochemical oxidation occurs during discharge of a lithium or lithium-ion voltaic cell and at which electrochemical reduction occurs during charging of a lithium or lithium-ion voltaic cell. Similarly, the term "cathode", as used herein, refers to an electrode at which electrochemical oxidation occurs during discharge of a lithium or lithium-ion voltaic cell and at which electrochemical reduction occurs during charging of a lithium or lithium-ion voltaic cell. Thus, in some implementations, the lithium or lithium-ion electrode 200 can be a lithium metal electrode, a graphite electrode, or any other electrode suitable for use as an anode in a lithium or lithium-ion voltaic cell.

As shown in FIG. 1, the protected lithium or lithium-ion anode 205 includes the lithium or lithium-ion anode 200 with an SEI 206 that is formed during the forming an SEI step 110. As discussed below, the SEI 206 provides good Li-ion conductivity and also stabilizes the protected lithium or lithium-ion anode 205 in the presence of water, enabling the protected lithium or lithium-ion anode 205 to be used with a "wet" electrolyte.

The method 100 also includes a step 120 of assembling a wet test cell 300. The wet test cell 300 can include the protected lithium or lithium-ion anode 205 opposite a cathode 310. The cathode 310 can be of any suitable cathode material. The wet test cell 300 further includes a wet electrolyte 320, in contact with the SEI 206 of the protected anode 205, and generally providing direct or indirect ionic communication between the protected anode 205 and the cathode 310. It will be appreciated that in certain test implementations, the wet test cell 300 can be a symmetric cell, having no cathode 310, but having opposed protected anodes 205 contacting the wet electrolyte 320 and connected to a reversible power supply 250.

The wet electrolyte 320 can generally be any electrolyte able to support lithium redox electrochemistry, and further including a significant proportion of water. Thus, in various implementations, the wet electrolyte can include water present at a concentration of: at least 50 ppm; or at least 100 ppm; or at least 200 ppm; or at least 300 ppm; or at least 400 ppm; or at least 500 ppm; or at least 600 ppm; or at least 700 ppm; or at least 800 ppm; or at least 900 ppm; or at least 1000 ppm; or at least 2000 ppm; or at least 3000 ppm; or at least 4000 ppm, or at least 16000. In some implementations, the wet electrolyte 320 can include water at any of the aforementioned minima, and with a maximum of 50000 ppm. In some implementations, the SEI forming step 110 can be performed by cycling the first cell 210 at 1 mAh·cm$^{-2}$ for at least 10 cycles.

The lithium or lithium-ion electrode 200 can generally be any electrode suitable for use as an anode in a lithium or lithium-ion voltaic cell 300. It will be understood that the term "anode", as used herein, refers to an electrode at which electrochemical oxidation occurs during discharge of a lithium or lithium-ion voltaic cell 300 and at which electrochemical reduction occurs during charging of a lithium or lithium-ion voltaic cell 300. Similarly, the term "cathode", as used herein, refers to an electrode at which electrochemical oxidation occurs during discharge of a lithium or lithium-ion voltaic cell 300 and at which electrochemical reduction occurs during charging of a lithium or lithium-ion voltaic cell 300. Thus, in some implementations, the lithium or lithium-ion electrode 200 can be a lithium metal electrode, a graphite electrode, or any other electrode suitable for use as an anode in a lithium or lithium-ion voltaic cell 300.

As shown in FIG. 1, the protected lithium or lithium-ion anode 205 includes the lithium or lithium-ion anode 200 with an SEI 206 that is formed during the forming an SEI step 110. As discussed below, the SEI 206 provides good Li-ion conductivity and also stabilizes the protected lithium or lithium-ion anode 205 in the presence of water, enabling the protected lithium or lithium-ion anode 205 to be used with a "wet" electrolyte.

The dotted line labeled "O" in FIG. 1 represents taking the protected anode 205 out of the first cell 210 after completion of the forming an SEI step 110. Similarly, the dotted line labeled "I" represents putting the protected anode 205 into the wet voltaic lithium or lithium-ion voltaic cell 300. Current collectors 260 are shown generically, and need not be of the same composition or structure.

The method 100 can optionally include a step of washing the protected anode 205, performed after the forming an SEI step 110 and before the assembly step 120. It will generally be desirable that such a wash step be performed with a solvent capable of at least partially solubilizing the SEI formation electrolyte 220. Suitable examples can include, but are not limited to, multi-dentate ethers (i.e. ether solvents having more than one ethereal oxygen), such as propylenecarbonate or dimethylcarbonate.

The method 100 can also include a step of operating the wet test cell 300. The operating step can be performed, for example, by connecting the wet test cell 300 to a circuit and discharging, charging, or performing one or more charge/discharge cycles of the wet test cell 300.

Figure 3A:
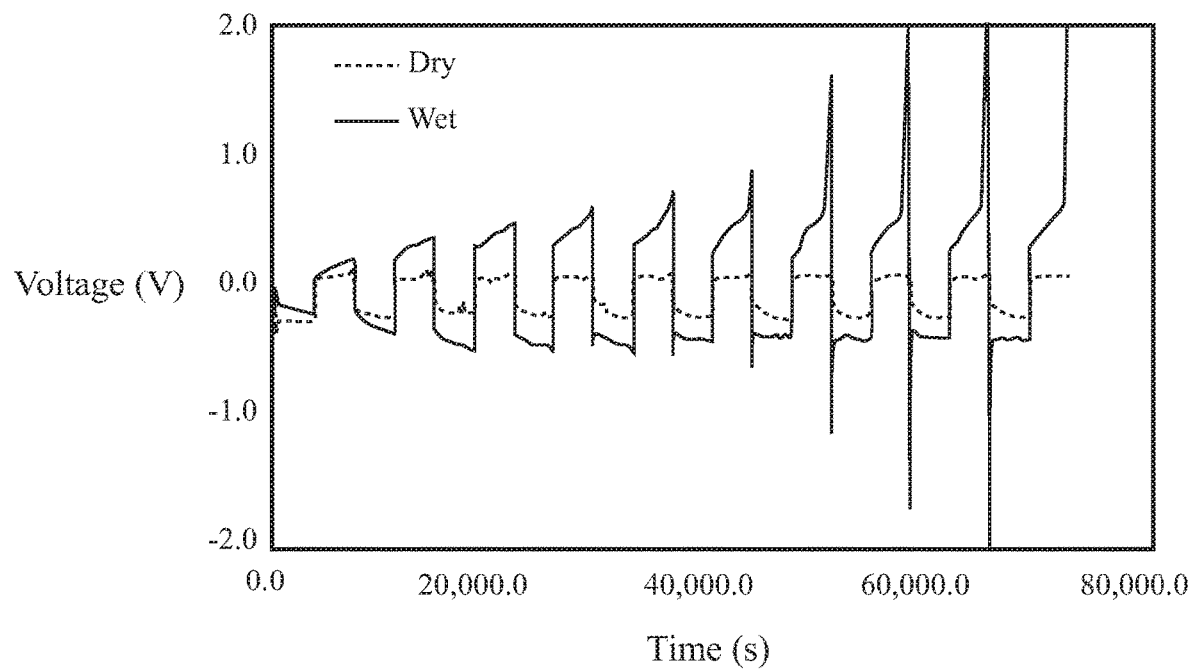
FIG. 3A is a plot of cell voltage vs. time during an SEI formation step in the method of FIG. 1 for two electrodes, using either a wet or a dry SEI formation electrolyte.

FIG. 3A shows a representative plot of electric potential as a function of time, produced during a step of forming a SEI, the step performed with two different SEI formation electrolytes: "Wet" and "Dry". Both SEI forming steps are performed with an electrode of lithium metal and an SEI formation electrolyte of 1:1 $P_{1222}$FSI:LiFSI. The "Wet" system further includes 1% water, by volume. The data clearly show that the overpotential substantially increases during the SEI formation step in the presence of water, and became significantly higher than that of the dry system.

Figure 3B:
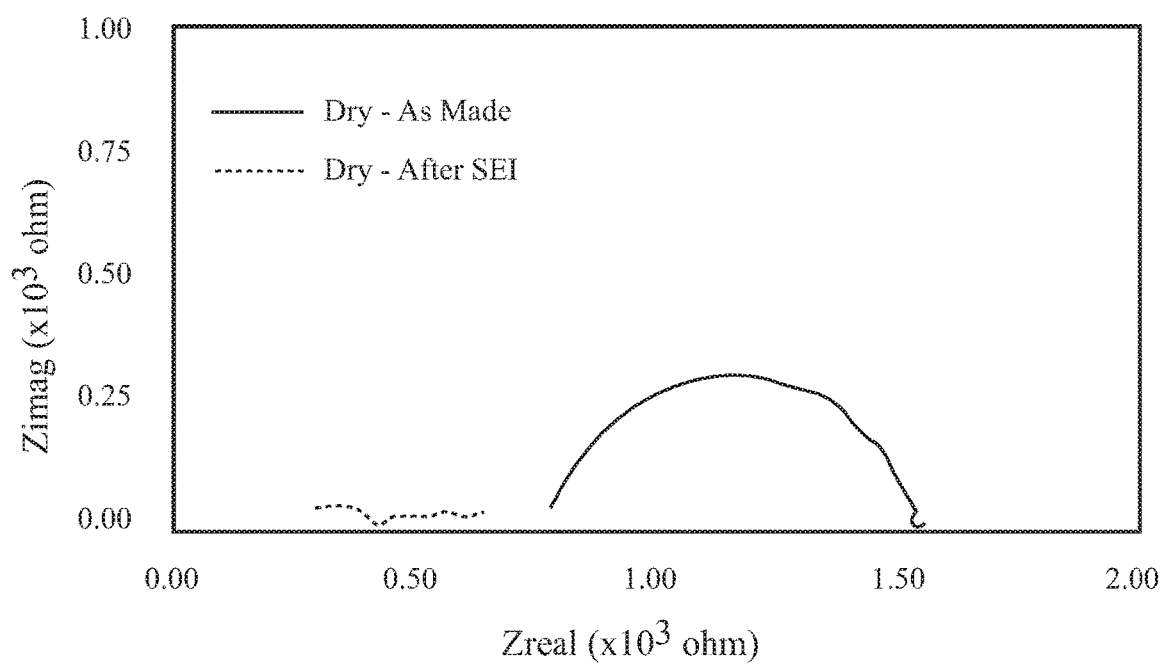
FIGS. 3B and 3C show Nyquist Impedance plots for the protected anodes produced by the SEI formation steps of FIG. 3A.
Figure 3C:
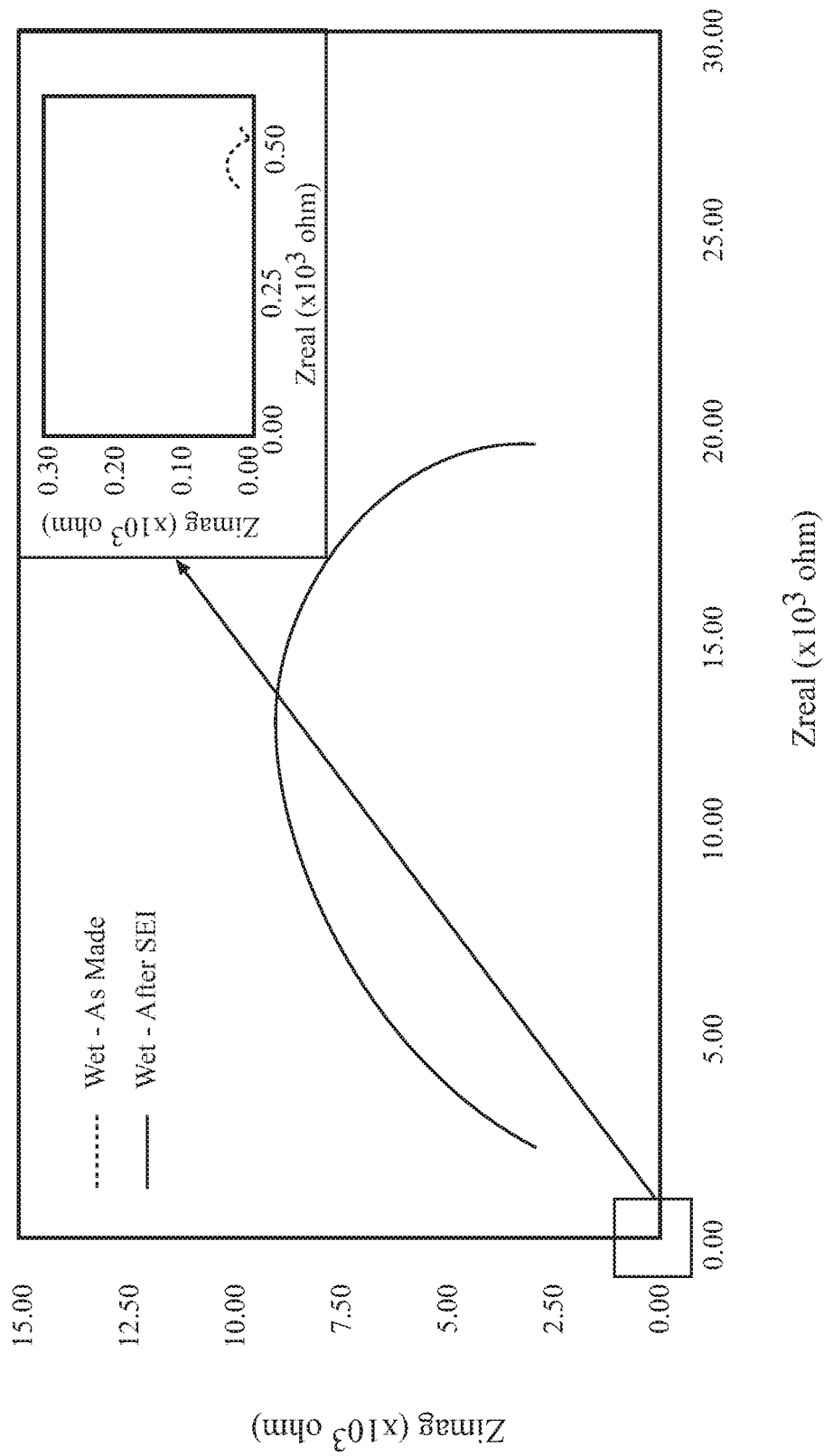

FIGS. 3B and 3C show Nyquist Impedance plots for the protected anodes produced by the SEI formation steps of FIG. 3A. Specifically, FIG. 3B shows an impedance plot for a protected anode produced by forming an SEI in a dry SEI formation electrolyte, while FIG. 3C shows an impedance plot for the protected anode produced by forming an SEI in the SEI formation electrolyte with 1% water. As shown in FIG. 3C, the protected anode produced by forming an SEI in the wet SEI formation electrolyte had a significant resistance increase in comparison to the corresponding electrode prior to forming an SEI (i.e. "as made"). As shown in FIG. 3B, the protected anode 205 produced by forming an SEI in the dry SEI formation electrolyte surprisingly had a decrease in resistance compared to the corresponding electrode prior to forming an SEI.

Figure 4A:
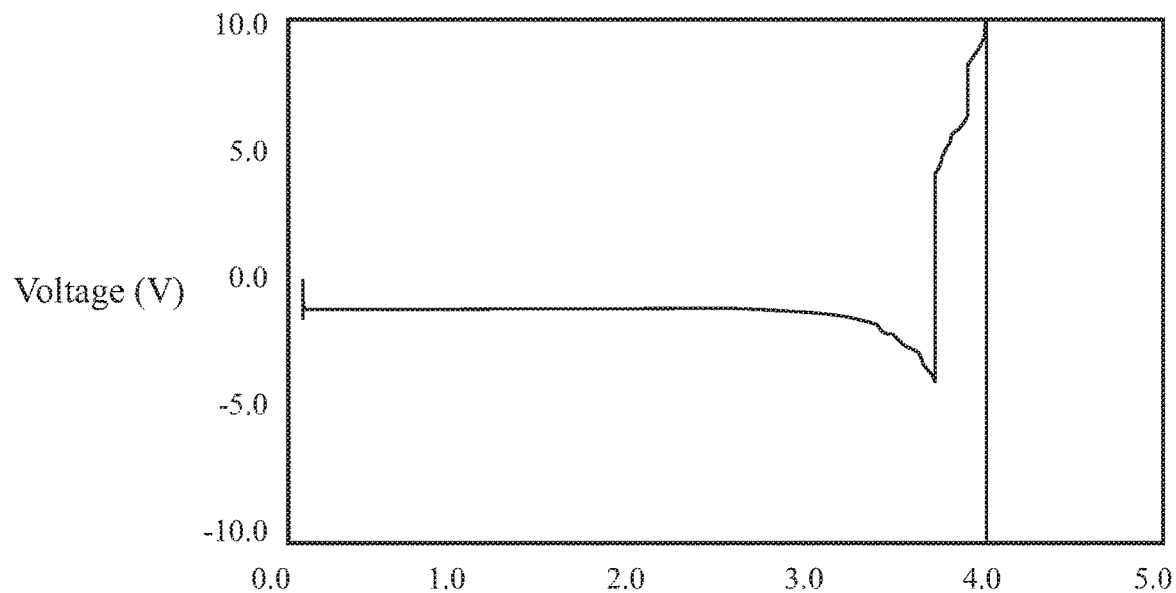
FIGS. 4A-4C show test data for three wet lithium voltaic cells made in accordance with the present teachings.
Figure 4B:
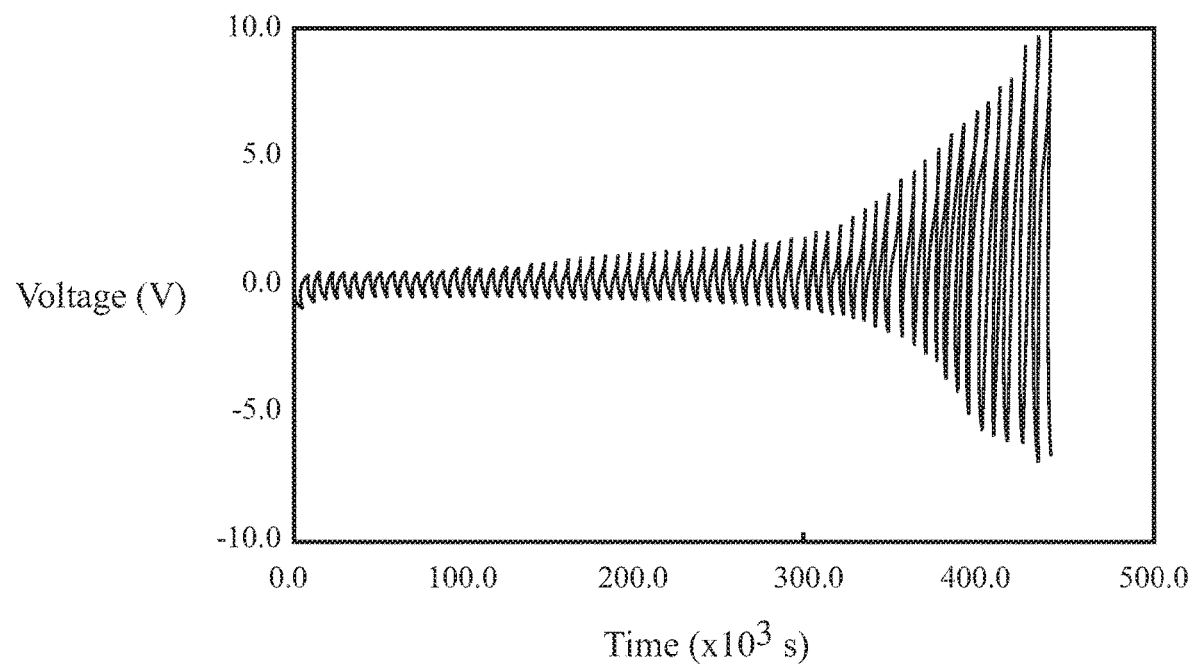
Figure 4C:
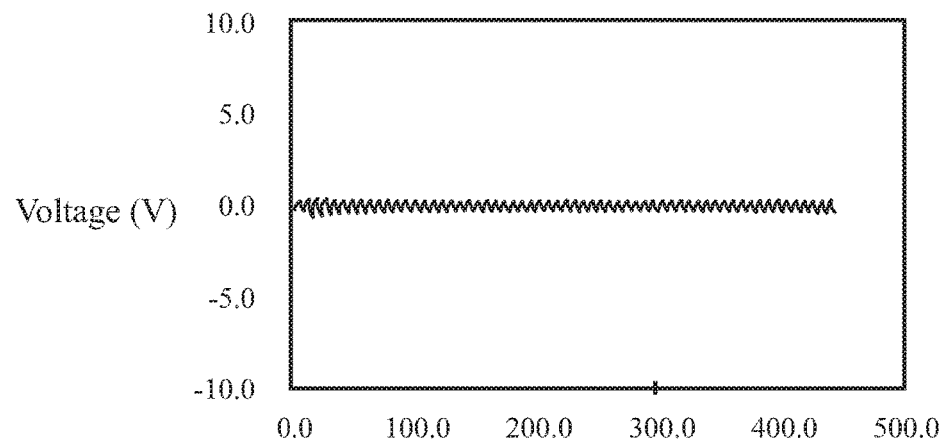

FIGS. 4A-4C show test data for three wet lithium voltaic cells 300 of the present teachings. All test data are for wet lithium or lithium ion voltaic cells 300 having two identical electrodes. The cell of FIG. 4A has unprotected electrodes; the cell of FIG. 4B has the protected anodes 205 of FIG. 3A that are produced by forming an SEI in a wet SEI formation electrolyte; and the cell of FIG. 4C has the protected anodes 205 of FIG. 3B that are produced by forming an SEI in a dry SEI formation electrolyte. The wet electrolyte for all three tests is 1 M Lithium bis(fluoromethylsulfonyl)imide (LiTFSI) in propylene carbonate (PC) with 1% water, by volume.

The cell of FIG. 4A, having unprotected electrodes, failed in the first cycle. The cell of FIG. 4B having protected anodes formed in the wet SEI formation electrolyte performed reasonably well for the first 300×10$^3$ seconds of cycling and then progressively proceeded toward failure. The cell of FIG. 4C, having protected anodes formed in the dry SEI formation electrolyte, demonstrated excellent performance with low overpotential for the entire test duration of 125 hours. These results clearly indicate that, while an SEI formed in a wet SEI formation electrolyte provides a significant degree of protection from water to the protected anode, SEI formation in a dry SEI formation electrolyte produces a superior result. In all remaining results, SEI formation is performed in a dry SEI formation electrolyte and protected anodes are washed in dimethyl carbonate.

Figure 5:
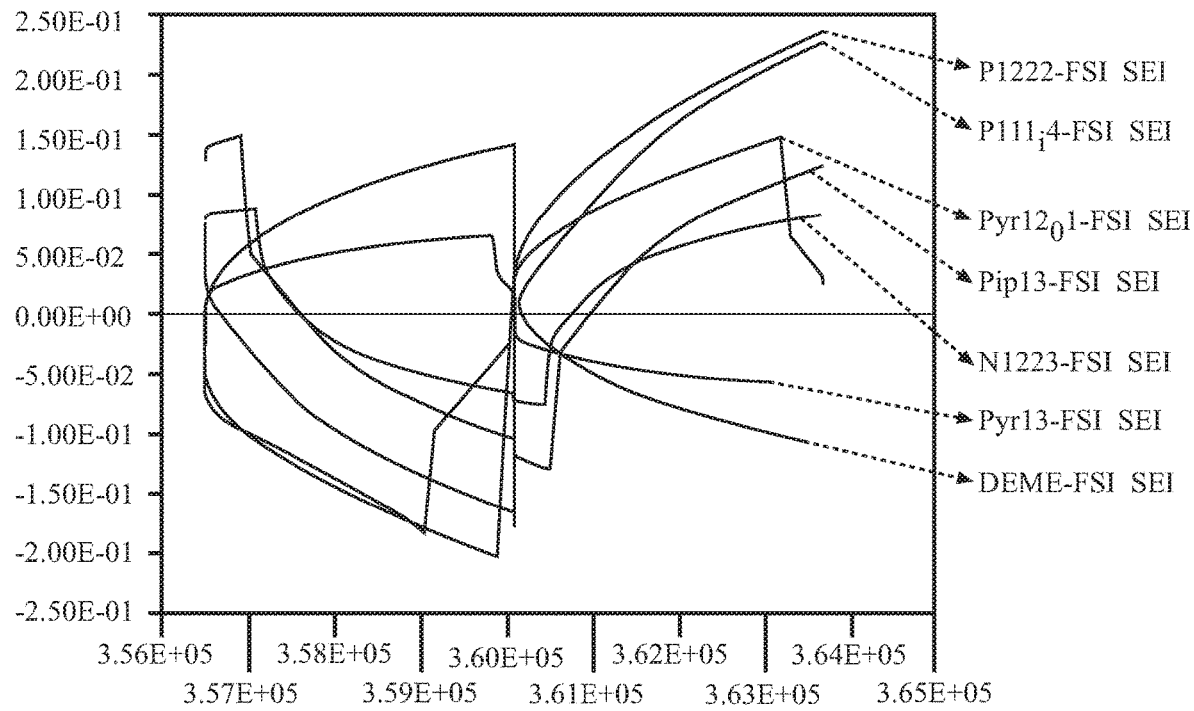
FIG. 5 shows the $50^{th}$ cycle of cells having seven different wet lithium voltaic cells.

FIG. 5 shows the 50$^{th}$ charge/discharge cycle for seven different exemplary wet lithium voltaic cells 300 with 1% water, each having a different protected anode 205. The various cells of FIG. 5 are symmetrical cells as described above, and have protected anodes that were formed in seven different SEI formation electrolytes and that are, as shown more fully below, among the best performing examples.

Figure 6A:
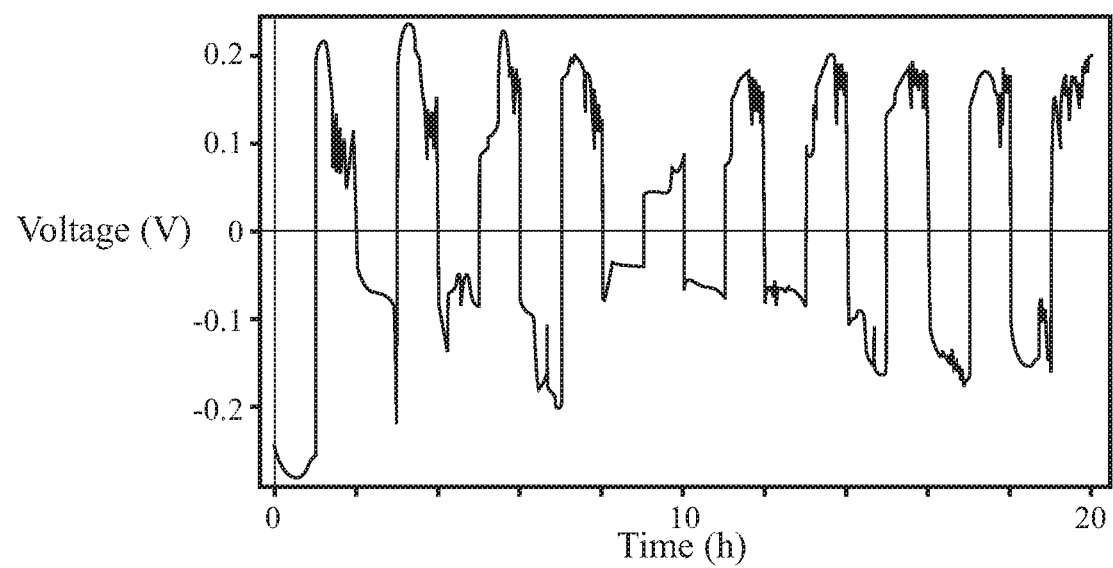
FIGS. 6A and 6B are voltage profiles of an SEI formation step performed in SEI formation electrolytes having DEME-FSI and DEME-TFSI ionic liquids, respectively.
Figure 6B:
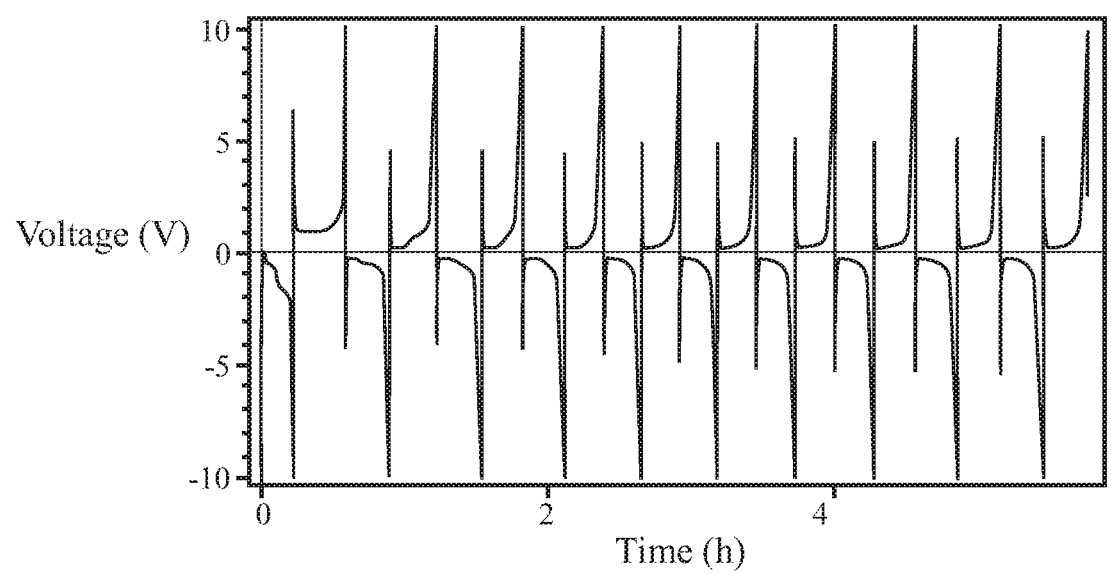
Figure 6C:
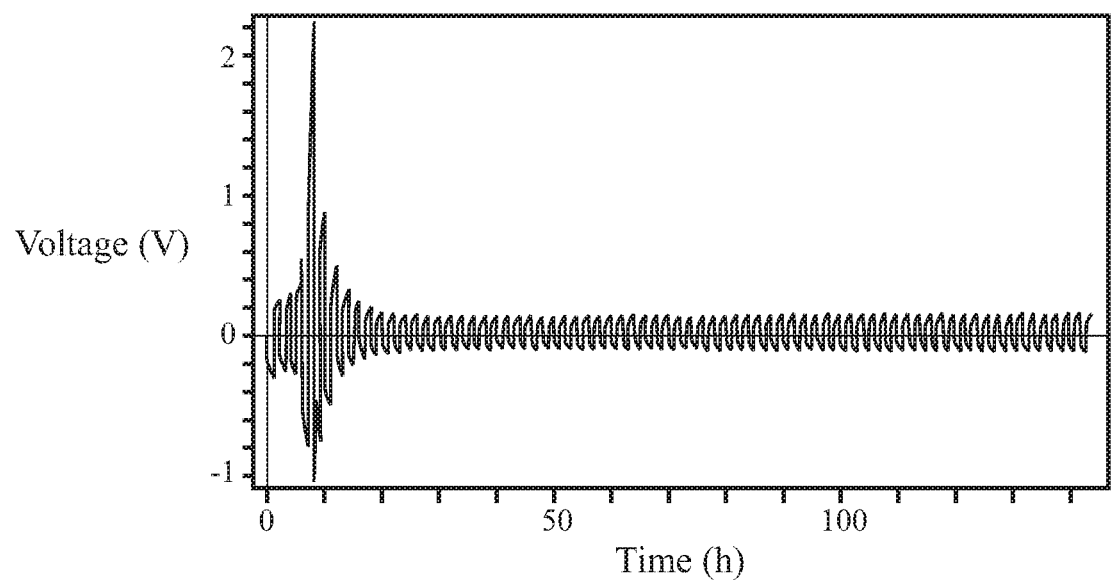
FIGS. 6C and 6D are voltage profiles of the cycling data for the wet lithium test cells corresponding to FIGS. 6A and 6B, respectively.
Figure 6D:
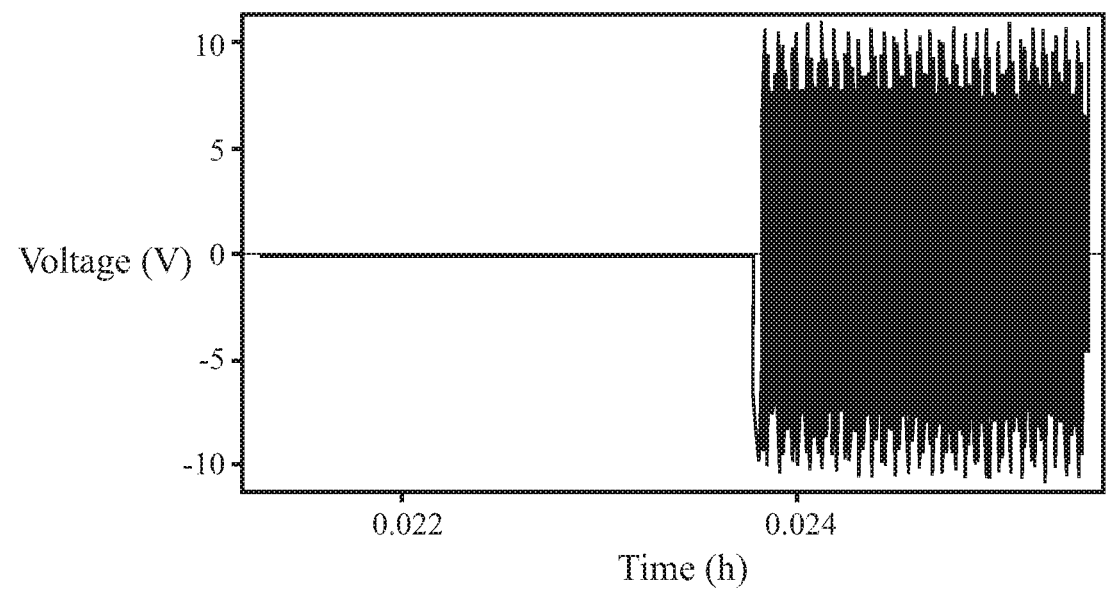

FIGS. 6A and 6B show voltammograms of SEI formation in SEI formation electrolytes having DEME-FSI and DEME-TFSI, respectively. FIGS. 6C and 6D show the cycling data for the corresponding wet test cells 300, respectively. The results suggest that SEI formation electrolytes having FSI as anion may be superior to those having TFSI anion, a result elaborated more fully below.

Also disclosed is a method for optimizing an Artificial SEI Transplantation (AST) system. The method includes a step of providing a library of SEI formation electrolytes, each electrolyte in the library having at least one lithium salt and at least one ionic liquid. In certain implementations, the SEI formation electrolytes in the library of SEI formation electrolytes can include a lithium salt and an ionic liquid of the types described above.

The method for optimizing an AST system can further include performance of an SEI formation step 110, as described above, using each SEI formation electrolyte 220 in the library of SEI formation electrolytes. This means that a separate SEI formation cell 210 is prepared for each SEI formation electrolyte 220 in the library and multiple charge/discharge cycles are performed on the electrode 200 in each SEI formation cell 210 in order to convert the electrode 200 in each SEI formation cell 210 into a protected lithium or lithium-ion anode 205. This thus produces a library of protected lithium and/or lithium-ion anodes, each individual protected lithium or lithium-ion anode 205 in the library corresponding to an SEI formation electrolyte 220 in the library of SEI formation electrolytes.

The method for optimizing an AST system can further include a step of assembling a library of wet test cells, or test cells, as described above with respect to step 120, each wet test cell in the library having the protected anode and a wet electrolyte in contact with the protected anode, the wet electrolyte comprising at least 50 ppm water. The method for optimizing an AST system can further include a step of measuring an electrochemical property of each wet test cell in the library of wet test cells. For example, the measuring step could include monitoring current consistency over multiple cycles of potentiostatic cycling, or overpotential at a particular cycle, such as the $50^{th}$ cycle. The method for optimizing an AST system can further include a step of selecting an SEI formation electrolyte 220 on the basis of the measured electrochemical property. For example, a specific SEI formation electrolyte could be selected on the basis that its corresponding protected anode exhibits the greatest electrochemical stability over a given number of charge/discharge cycles.

FIG. 7 shows a table displaying results from an exemplary performance of the method for optimizing an AST system. In total, seventeen ionic liquid electrolytes were screened with varying compositions of cation, anion, and structure, and are roughly listed from top-to-bottom in FIG. 7 in order of best-to-worst performance. It will be noted that the top performing electrolytes shown in FIG. 7 all include an FSI anion, suggesting that the anion plays a pivotal role in the SEIs formed during the method. Further, it was observed that certain ammonium based ILEs outperformed all phosphonium based ILE, particularly at higher water concentrations, but that certain examples of both ammonium-based and phosphonium-based cations were effective. This suggests that the type of cation may not necessarily be as important as the type of anion used to form the SEI for water protection in the test electrolyte. Recent literature has summarized claims of the $FSI^-$ anion being a superior SEI former for lithium and lithium-ion batteries; supporting the results observed here while also reinforcing the diverse electrolyte compatibility of the $FSI^-$ anion itself. Insignificant performance differences in test electrolyte cycling were noted with changes in ILE structure as observed for the data displayed for the top 2 SEI performers ($N_{1223}$FSI and DEMEFSI).

It will is to be understood that the method 100 for optimizing an AST system can be adapted to other battery electrochemistries, such as magnesium, calcium, or sodium batteries. In such varied implementations, the step 110 of forming an SEI is performed by via multiple charge/discharge cycles on an active material electrode 200 in a first cell 210 (alternatively referred to as an SEI formation cell 210) having an SEI formation electrolyte 220. The SEI formation electrolyte 220 has an active cation (e.g. $Mg^{2+}$ in the case of a magnesium battery), and the active material electrode is configured to incorporate the active cation in either metallic or cationic form. For example, a magnesium metal anode can be configured to incorporate metallic magnesium metal.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A method for optimizing an Artificial SEI Transplantation (AST) system, the method comprising:
providing a library of SEI formation electrolytes, each electrolyte in the library having at least one lithium salt and at least one ionic liquid;
preparing a library of protected anodes by, for each of the SEI formation electrolytes in the library of SEI formation electrolytes, forming SEI on an anode in a cell having a respective SEI formation electrolyte such that the protected anodes are prepared, wherein the protected anodes consist of at least one of protected lithium anodes and protected lithium-ion anodes;
preparing a library of wet test cells by, for each of the protected anodes in the library of protected anodes, assembling a wet test cell comprising:
one of the protected anodes; and
a wet electrolyte in contact with the one protected anode, the wet electrolyte comprising at least 50 ppm water;
measuring an electrochemical property of each wet test cell in the library of test cells; and
selecting an SEI formation electrolyte on the basis of the measured electrochemical property.

2. The method as recited in claim 1, wherein each of the at least one lithium salts is selected from the group consisting of:
lithium bis(fluorosulfonyl)imide (LiFSI),
lithium bis(trifluoromethanesulfonyl)imide (LiTFSI), and
lithium dicyanamide (LiDCA); and
and each of the at least one ionic liquids comprises:
a cation selected from the group consisting of: 1-methyl-1-propylpyrrolidinium (Pyr13); N-methyl-N,N-diethyl-N-propylammonium (N1223); N,N-diethyl-N-methyl-N-(2-methoxyethyl)-ammonium (DEME); 1,1-methylpropylpiperidinium (Pip13); N-methyl-N-(2-methoxyethyl)-pyrrolidinium (Pyr12$_o$1); trimethylisopropylphosphonium (P111$_i$4); methyltriethylphosphonium (P1222); methyltributylphosphonium (P1444); N,N-dimethyl-N-(2-methoxyethyl)-N-ethyl-ammonium (DMME); 1-methyl-1-butylpyrrolidinium (Pyr14); N-methyl-N'-ethylimidazolium (IM12); N,N,N-trimethyl-N-propylammonium (N1113); and mixtures thereof; and
an anion selected from the group consisting of FSI, TFSI, and DCA.

3. The method as recited in claim 1, wherein at least one SEI formation electrolyte has the at least one lithium salt present at a molar ratio, relative to ionic liquid of: at least 1:1.

4. The method as recited in claim 1, further comprising, prior to assembling each wet test cell, washing each protected anode with a solvent in which the SEI formation electrolyte is soluble.

5. The method as recited in claim 1, wherein at least one wet electrolyte comprises water present at a concentration of at least 100 ppm.

6. The method as recited in claim 1, wherein at least one wet electrolyte comprises water present at a concentration of at least 500 ppm.

7. The method as recited in claim 1, wherein at least one wet electrolyte comprises water present at a concentration of at least 1000 ppm.

8. The method as recited in claim 1, wherein at least one wet electrolyte comprises water present at a concentration of at least 4000 ppm.

9. The method as recited in claim 1, wherein at least one wet electrolyte comprises water present at a concentration of at least 16000 ppm.

10. The method as recited in claim 1, wherein the at least one lithium salt is present at its saturation point in the at least one ionic liquid.

11. A method for optimizing an Artificial SEI Transplantation (AST) system, the method comprising:
providing a library of SEI formation electrolytes, each electrolyte in the library having:
an active cation salt comprising:
an active cation; and
an anion selected from the group consisting of:
lithium bis(fluorosulfonyl)imide (LiFSI),
lithium bis(trifluoromethanesulfonyl)imide (LiTFSI), and
lithium dicyanamide (LiDCA); and
at least one ionic liquid;
preparing a library of protected active material anodes configured to incorporate the active cation in metallic or cationic form, by forming, for each SEI formation electrolyte in the library of SEI formation electrolytes, an SEI on an active material anode by performing multiple charge/discharge cycles on the active material anode in a cell having a respective SEI formation electrolyte such that the protected active material anodes are prepared;
preparing a library of wet test cells by, for each of the protected active material anodes in the library of protected active material anodes, assembling a test cell comprising:
one of the protected active material anodes; and
a wet electrolyte in contact with the one protected active material anode, the wet electrolyte comprising at least 50 ppm water;
measuring an electrochemical property of each wet test cell in the library of test cells; and
selecting an SEI formation electrolyte on the basis of the measured electrochemical property.

12. The method as recited in claim 11, wherein the active cation is selected from the group consisting of magnesium, sodium, and calcium.

13. The method as recited in claim 11, wherein the at least one ionic liquid comprises a cation selected from the group consisting of: 1-methyl-1-propylpyrrolidinium (Pyr13); N-methyl-N,N-diethyl-N-propylammonium (N1223); N,N-diethyl-N-methyl-N-(2-methoxyethyl)-ammonium (DEME); 1,1-methylpropylpiperidinium (Pip13); N-methyl-N-(2-methoxyethyl)-pyrrolidinium (Pyr12$_o$1); trimethylisopropylphosphonium (P111$_i$4); methyltriethylphosphonium (P1222); methyltributylphosphonium (P1444); N,N-dimethyl-N-(2-methoxyethyl)-N-ethyl-ammonium (DMME); 1-methyl-1-butylpyrrolidinium (Pyr14); N-methyl-N'-ethylimidazolium (IM12); N,N,N-trimethyl-N-propylammonium (N1113); and mixtures thereof.

* * * * *